US012359961B2

(12) United States Patent
Nance

(10) Patent No.: US 12,359,961 B2
(45) Date of Patent: Jul. 15, 2025

(54) METHOD AND SYSTEM FOR INCREASING THE ACCURACY OF AIRCRAFT WEIGHT AND ASSOCIATED CENTER OF GRAVITY DETERMINATIONS

(71) Applicant: C. Kirk Nance, Keller, TX (US)

(72) Inventor: C. Kirk Nance, Keller, TX (US)

(*) Notice: Subject to any disclaimer, the term of this patent is extended or adjusted under 35 U.S.C. 154(b) by 422 days.

(21) Appl. No.: 17/992,163

(22) Filed: Nov. 22, 2022

(65) Prior Publication Data

US 2023/0160739 A1     May 25, 2023

Related U.S. Application Data

(60) Provisional application No. 63/282,137, filed on Nov. 22, 2021.

(51) Int. Cl.
*G01G 19/10*       (2006.01)
*B64C 25/20*       (2006.01)
(Continued)

(52) U.S. Cl.
CPC ............ *G01G 19/10* (2013.01); *B64C 25/20* (2013.01); *B64D 45/00* (2013.01); *G01M 1/125* (2013.01); *G01P 15/18* (2013.01)

(58) Field of Classification Search
CPC ....... G01M 19/11; G01M 1/125; B64C 25/20; B64C 25/60; B64D 45/00; G01P 15/18; G01G 19/07
(Continued)

(56) References Cited

U.S. PATENT DOCUMENTS 2,255,814 A    9/1941   Roche
3,473,369 A   10/1969   Garrison
(Continued)

FOREIGN PATENT DOCUMENTS

WO   WO2010115893   4/2010
WO   WO2022020825   1/2022

OTHER PUBLICATIONS

Patent Cooperation Treaty International Search Report on International Application No. PCT/US98/05007 entitled "Aircraft Weight And Center Of Gravity Indicator" (5 sheets), Applicant: Trinity Airweighs, LLC, (no date).
(Continued)

*Primary Examiner* — Jacques M Saint Surin
(74) *Attorney, Agent, or Firm* — Brian K. Yost; Decker Jones, PC

(57) ABSTRACT

The methods and systems provide for increasing the accuracy of aircraft weight and center of gravity determination through the use of filtered strut pressure measurements. Aircraft vertical and horizontal accelerations are determined as the aircraft is taxiing, and used to identify and reduce the number of significantly distorted pressure measurements, to allow the lesser distorted pressure measurements to be averaged, and a lesser number of distorted pressure measurements to be averaged; further identifying the aircraft in near-neutral acceleration and strut pressure values near-neutral of strut seal friction distortions. Pressure sensors, accelerometers, and an inclinometer are mounted in relation to landing gear struts to monitor, measure and record strut pressure as related to strut telescopic movement, rates of strut telescopic movement and aircraft vertical and horizontal accelerations; experienced by landing gear struts, as the aircraft proceeds through typical ground and taxi operations.

18 Claims, 7 Drawing Sheets

(51) Int. Cl.
  *B64D 45/00* (2006.01)
  *G01M 1/12* (2006.01)
  *G01P 15/18* (2013.01)

(58) Field of Classification Search
  USPC .............................................................. 177/1
  See application file for complete search history.

(56) References Cited

U.S. PATENT DOCUMENTS

| | | | |
|---|---|---|---|
| 3,513,300 A | 5/1970 | Elfenbein et al. | |
| 3,581,836 A | 6/1971 | Segerdahl | |
| 3,584,503 A | 6/1971 | Senour | |
| 3,701,279 A | 10/1972 | Harris et al. | |
| 3,800,893 A | 4/1974 | Ramsay et al. | |
| 3,802,523 A | 4/1974 | Clark | |
| 3,900,828 A | 8/1975 | Lage et al. | |
| 4,007,894 A | 2/1977 | Hartel | |
| 4,034,334 A | 7/1977 | Allyn | |
| 4,110,605 A | 8/1978 | Miller | |
| 4,225,926 A | 9/1980 | Wendt | |
| 4,371,182 A | 2/1983 | Brown | |
| 4,446,524 A | 5/1984 | Wendt | |
| 4,490,802 A | 12/1984 | Miller | |
| 4,502,555 A | 3/1985 | Gower | |
| 4,597,548 A | 7/1986 | Bergloff et al. | |
| 4,607,530 A | 8/1986 | Chow | |
| 4,637,574 A | 1/1987 | Handwerk | |
| 4,651,292 A | 3/1987 | Jeenicke et al. | |
| 4,715,003 A | 12/1987 | Keller et al. | |
| 4,796,212 A | 1/1989 | Kitagawa | |
| 4,866,640 A | 9/1989 | Morrison Jr. | |
| 4,935,885 A | 6/1990 | McHale et al. | |
| 4,979,595 A | 12/1990 | Paton | |
| 5,117,687 A | 6/1992 | Gerardi | |
| 5,214,586 A | 5/1993 | Nance | |
| 5,258,582 A | 11/1993 | Junginger | |
| 5,521,827 A | 5/1996 | Lindberg | |
| 5,548,517 A | 8/1996 | Nance | |
| 5,610,372 A | 3/1997 | Phillips et al. | |
| 6,032,090 A | 2/2000 | von Bose | |
| 6,128,951 A | 10/2000 | Nance | |
| 6,237,406 B1 | 5/2001 | Nance | |
| 6,237,407 B1 | 5/2001 | Nance | |
| 6,293,141 B1 * | 9/2001 | Nance | G01M 1/125 |
| | | | 73/178 T |
| 7,967,244 B2 * | 6/2011 | Long | G01G 19/07 |
| | | | 244/102 R |
| 9,045,237 B2 * | 6/2015 | Nance | G01M 17/04 |
| 9,927,319 B2 * | 3/2018 | Nance | G01G 19/07 |
| 10,859,431 B2 | 7/2020 | Nance | |
| 11,377,203 B2 | 7/2022 | Parker et al. | |
| 11,416,871 B2 | 8/2022 | Nance | |
| 11,913,823 B2 * | 2/2024 | Nance | F16F 9/0209 |
| 2006/0022091 A1 | 2/2006 | Peck et al. | |
| 2006/0220918 A1 | 10/2006 | Stockwell et al. | |
| 2022/0397445 A9 | 1/2022 | Nance | |

OTHER PUBLICATIONS

Phan, et al. Aircraft Landing Gear Fluid Level and Landing Energy Monitoring System, Jul. 3, 2012 (Jul. 3, 2012). [retrieved on Jan. 31, 2023] Retrieved from the internet: <URL: https://www.ndt.net. article/ewshm2012/papers/we3a2.pdf. pp. 1-5.

Matos, Taina, Written Opinion of the International Searching Authority for PCT/US2022/050729, Jan. 13, 2023, entire document, ISA/US.

* cited by examiner

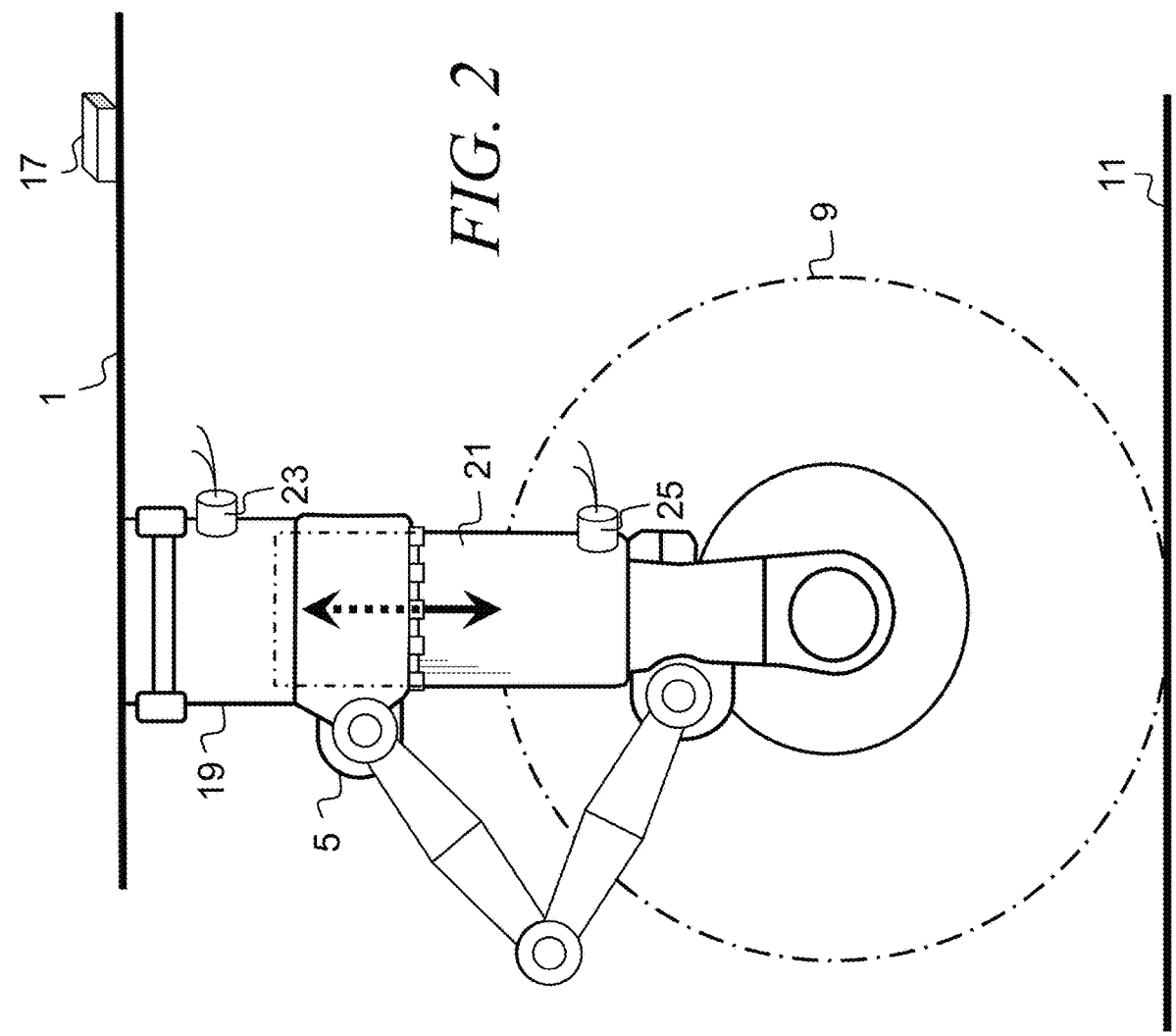

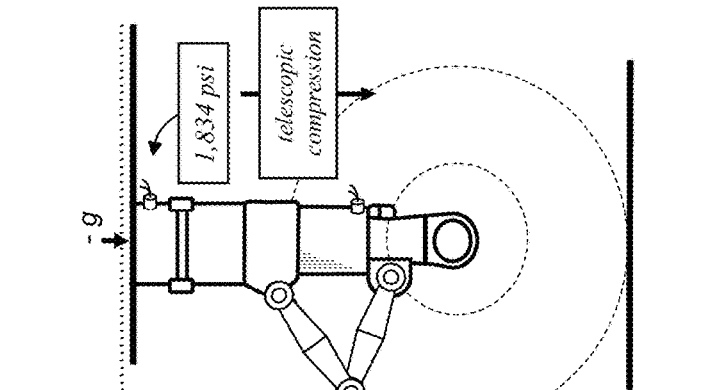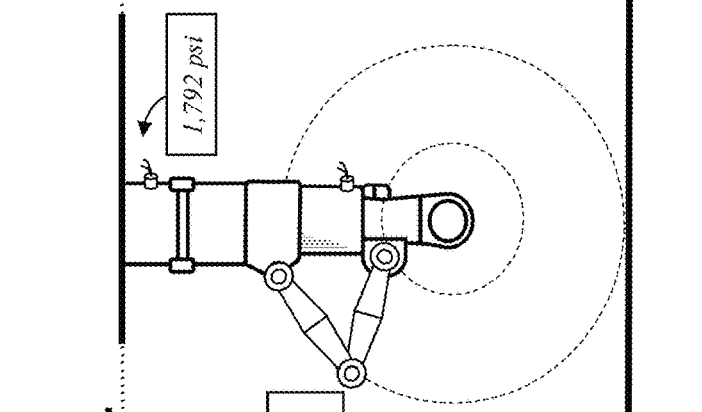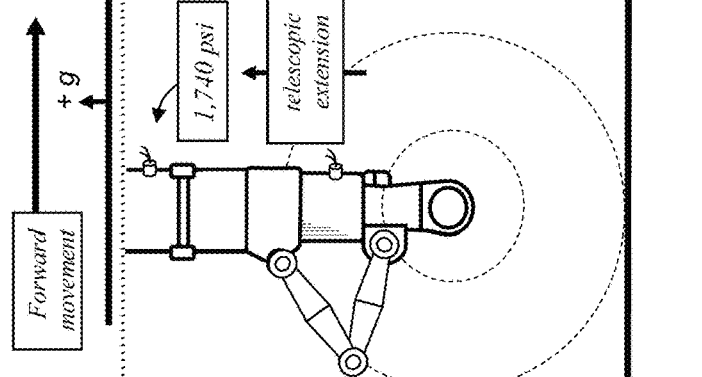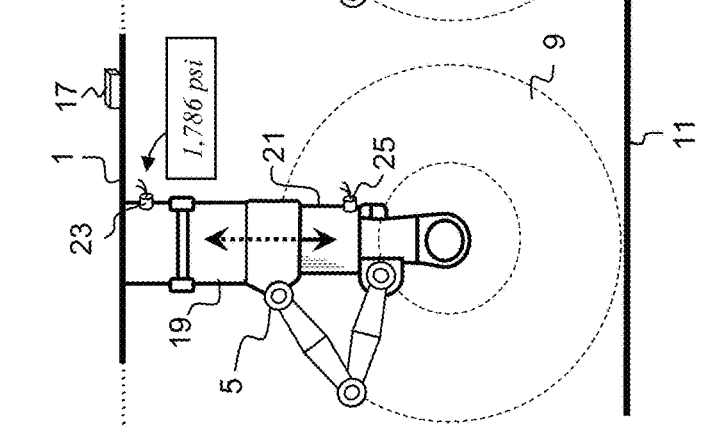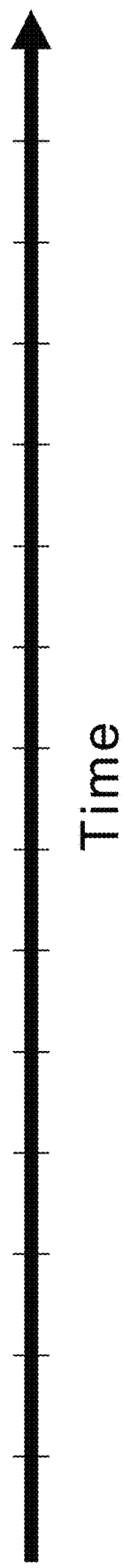

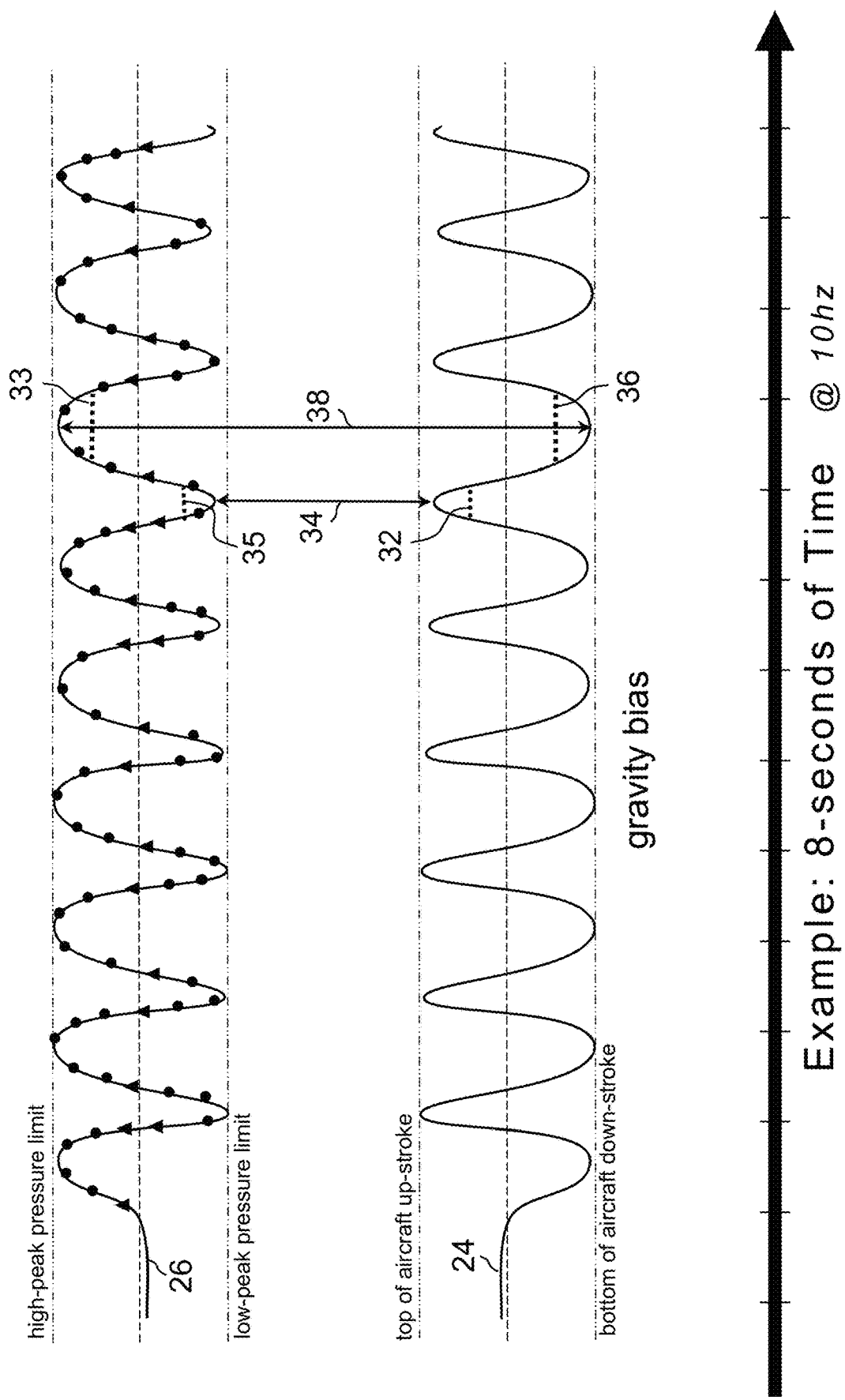

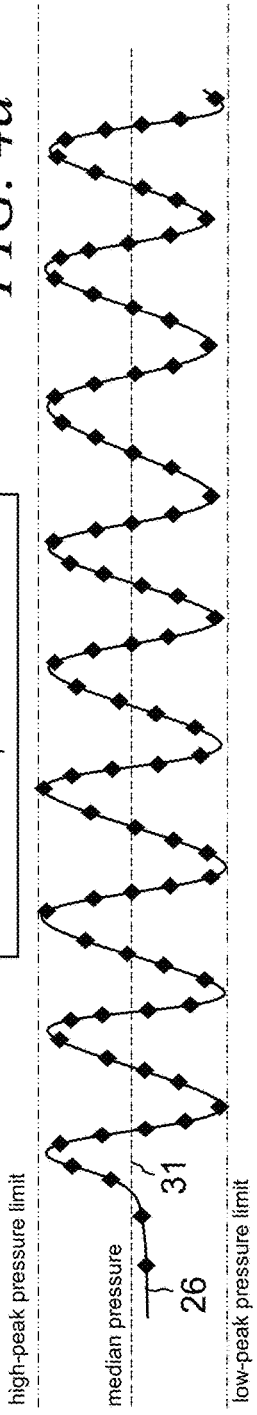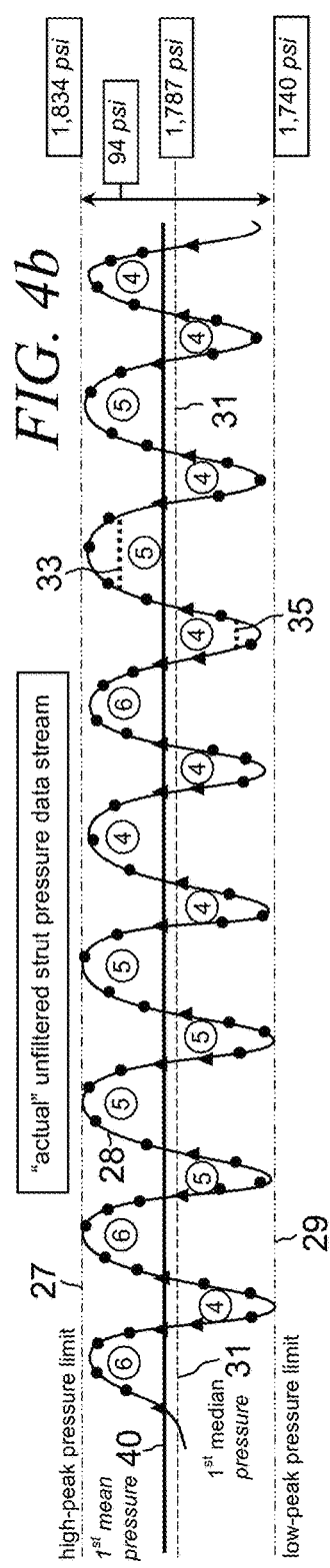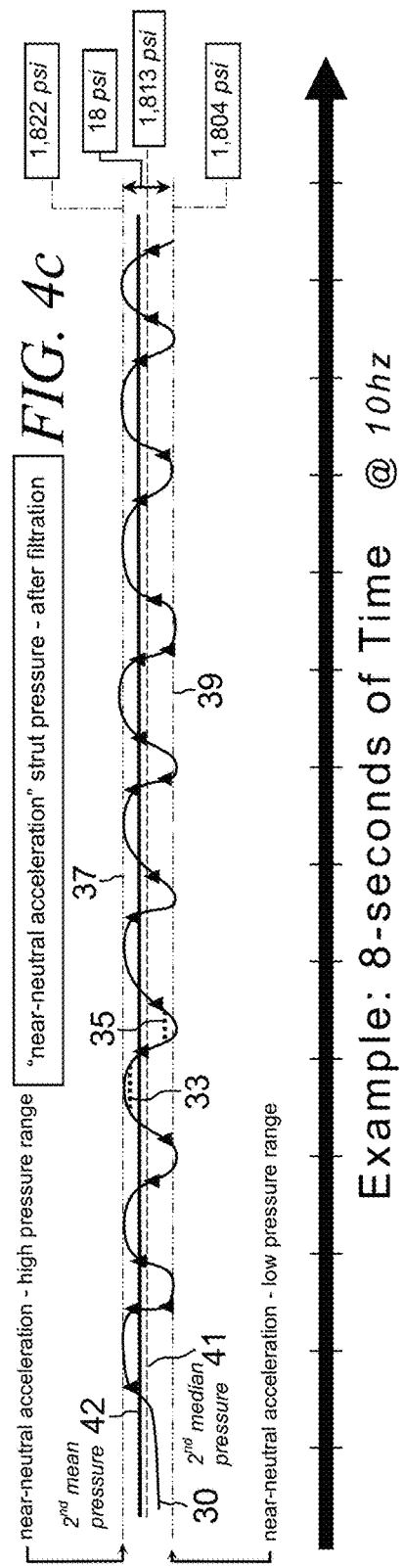

Computer 14

- Internal clock and calendar

Software Programs:

- Alpha: Measure, Record, Time-Stamp – Landing Gear Strut Pressures
- Beta: Measure, Record, Time-Stamp – Aircraft 3-Axis Acceleration
- Gamma: Tag respective Strut Pressures with respective Accelerations
- Delta: Determination of un-filtered peak and delta-pressure ranges
- Epsilon: Recognition of variations in pressure reversal – arcs
- Zeta: Determination of un-filtered 1st median-pressure value 31
- Eta: "un-filtered" gravity bias correction – 1st mean-pressure value 40
- Theta: Discarding identified pressures tagged with excessive acceleration
- Iota: Determination of filtered – 2nd median-pressure value 41
- Kappa: "filtered" gravity bias correction – 2nd mean-pressure value 42
- Lambda: Re-balance the number of high pressures vs. low pressures
- Mu: Correction for friction fingerprint at various pressure ranges
- Nu: Correction for aircraft and landing gear angle variations Connected sensors:
- 15 – Inclinometer
- 16 – 3-Axis Accelerometer Nose Landing Gear
- 17 – 3-Axis Accelerometer Main Landing Gear
- 23 – Upper Pressure Sensor Nose Landing Gear
- 23 – Upper Pressure Sensor Left Main Landing Gear
- 23 – Upper Pressure Sensor Right Main Landing Gear
- 25 – Lower Pressure Sensor Nose Landing Gear
- 25 – Lower Pressure Sensor Left Main Landing Gear
- 25 – Lower Pressure Sensor Right Main Landing Gear Apparatus Block Diagram

*FIG. 6*

METHOD AND SYSTEM FOR INCREASING THE ACCURACY OF AIRCRAFT WEIGHT AND ASSOCIATED CENTER OF GRAVITY DETERMINATIONS

This application claims the benefit of U.S. Provisional Patent Application No. 63/282,137, filed Nov. 22, 2021, the contents of which are incorporated herein in their entirety.

BACKGROUND OF THE INVENTION

Automated onboard aircraft weight and balance systems have been an aviation goal for over 50 years. There are many prior art methods and designs for determining aircraft weight; many of these designs include the measurement of internal pressure within oleo type telescopic landing gear struts. There remains an industry desire to develop a method which deliverers an accurate aircraft weight measurement, while minimizing additional hardware and apparatus that increase the weight penalty, by adding weight to the airframe.

An aircraft is typically supported by plural landing gear struts. In many if not most cases, aircraft are supported by three landing gear struts. Landing gear struts are designed much like, and incorporate many of the features of, a typical telescopic shock absorber. The shock absorber of the landing gear strut utilizes internal seals to retain highly pressurized fluids, of both hydraulic oil and compressed gas. The aircraft weight is transferred to and is supported by the pressures contained within the landing gear struts. More simply said . . . "the weight of an aircraft rests upon 3-pockets of compressed gas." The supported weight is assumed to be proportional to internal landing gear strut pressure measured in "psi" (pounds per square inch). The aircraft landing gear strut can be used as an aircraft weighing scale, if the measured strut pressure is corrected for "pressure distortions" caused by landing gear strut seal friction.

When measuring the weight of an aircraft supported by oleo struts, the aircraft weight can be classified into two types. The first type of weight is commonly referred to as "sprung weight." The sprung weight is the vast majority of the aircraft weight and is suspended above the 3-pockets of compressed gas, within the telescopic landing gear strut. The second type of weight is a much smaller amount of the total weight and is commonly referred to as "unsprung weight." Unsprung weight is the weight of the landing gear components such as: brakes, wheels, tires and axles; which are located below the pockets of compressed gas. The unsprung weight is virtually a constant and unchanging weight. Brake wear and tire wear are the only variations to unsprung weight; and in the consideration of the aircraft total weight, the changes in unsprung weight are a very minimal amount.

A more accurate weight of the aircraft can be determined from the measurement of landing gear strut pressure, if distortions in measured strut pressure, induced by landing gear strut seal friction, are identified and reduced. As an Example: when weight is added to an aircraft and thereby transferred to the landing gear, the landing gear strut should immediately begin to compress and the pressure within the telescopic strut should immediately increase, in direct proportion to the amount of applied weight.

This does not happen.

The weight applied to each strut will not be immediately transferred to the working pressure within the landing gear strut, but instead some portion of that weight is initially supported by landing gear strut seal friction, which is created by the rubbing of telescopically sliding components within the landing gear such as the O-ring seals, gland nut, piston-wiper and piston-scraper; all rubbing against the surface of the strut's telescopic piston. The rubbing action between the telescopically sliding components of the landing gear strut, being its outer cylinder and inner piston, is often referred to as "frictional forces." As weight is applied to the telescopic strut and before the strut begins to compress, these frictional forces within the strut will support the initially applied weight, creating a falsely low strut pressure measurement as related to the "true-weight" supported. The measured pressure within strut will remain falsely low, even with the addition of more weight; until enough additional weight overcomes the weight supporting force of the seal friction, Once enough weight has been added to overcome seal friction, the strut will begin to compress and strut pressure will increase in direct proportion to the amount of additionally applied weight, but internal strut pressure will remain "falsely low" as compared to the true-weight supported; due to the distortions in strut pressure caused by landing gear strut seal friction. This strut seal friction can be characterized into two types. Static friction, which must be overcome before initial telescopic movement, and is often referred to as "breakout friction"; and dynamic friction, which is a lesser amount of friction, often referred to as "sliding friction", which is experienced after the telescopic piston has begun to slide into or out of the landing gear strut cylinder.

A similar but opposite pressure distortion occurs, as weight is removed from the landing gear. Friction will tend to trap internal pressure within the strut until enough weight has been removed that the trapped internal strut pressure will become sufficient to overcome the forces of seal friction, allowing the strut to telescopically extend. Strut pressure will now be "falsely high" as related to the true-weight supported, caused by the seal friction restricting the strut's telescopic movement. After the "static" breakout friction has been overcome, the lesser "dynamic" friction will continue, but with lesser distortions to internal strut pressures, in relation to the amount of weight supported.

The invention described herein uses a variety of aircraft hull and landing gear strut data harvesting sensors including pressure sensors to measure internal strut pressure, and in particular the "range" of internal pressures. Additional sensors are used to measure the horizontal groundspeed of the aircraft hull, inclination of the aircraft; and 3-axis acceleration for vertical and bi-directional horizontal movements.

As the aircraft is taxiing and strut pressures are recorded and monitored, oscillation patterns of high-peak pressure and low-peak pressure within the landing gear strut create a wave and the propagation of the wave's pressure values are recorded and tagged to corresponding accelerometer measurements. Hundreds of harvested and stored strut pressure measurements are recorded throughout the pressure oscillation waves, allowing for the identification of the range of "high-to-low-to-high-to-low" peak-pressure differentials, herein referred to as the "delta pressure" as the aircraft is taxiing at a constant weight.

The invention described herein offers improvements to prior art systems which teach methods of strut pressure correction by creation of a look-up table, stored within a computer memory, of previously measured breakout friction values; which have been recorded months or years earlier, through a system calibration process. Leaving the prior art system with potentially false assumptions that these historical breakout friction values have not changed due to seal wear or environmental changes, and have remained equivalent to any current strut breakout friction values.

Prior art methods teach the determination of breakout friction through a calibration procedure employed during the period of initial installation of the system's apparatus, where future references to the look-up table corrections for the breakout friction values will find a fixed value determined during some time in the past. Periodic re-calibrations of prior art systems can be performed, but any final months, just prior to the next re-calibration, will have the system potentially providing inaccurate measurements, with stale correction values.

The new invention described herein needs no re-calibration method, because it continuously measures seal friction at all times the aircraft is moving on the ground. Friction values are monitored and measured while the aircraft is taxiing, throughout and during variations in environmental changes; and are matched to aircraft 3-axis acceleration for further filtering to identify and remove distorted pressure measurements. Continual measurements are made during the daily flight operations as the aircraft is taxiing with the landing gear tires rolling across the airport taxiway. The bouncing of the aircraft along the taxiway will exercise the landing gear struts forcing telescopic movement, and changes in the aircraft's 3-axis accelerations. Though the weight of the aircraft remains constant, the pressure within the telescopic strut will fluctuate up and down, caused by inertia from the vertical transfer of the aircraft's constant weight. Earth's gravity will also affect the vertical movement of the aircraft as it travels horizontally along a taxiway. As an Example, to better illustrate the effects of Earth's gravity, one might consider pushing a two-wheel dolly loaded with weight along a horizontal pathway, which requires a set amount of force. Pushing the dolly at the same weight up an inclined pathway requires a greater force, while pushing the same weight down an incline requires a lesser force. As the aircraft is taxiing, Earth's gravity will tend to hold the aircraft down for a slightly longer period of time, thus pressure measurements recorded at a constant pressure sampling rate will record a slightly greater number of higher-pressure measurements during the aircraft's vertical down-stroke, when compared to the number of recorded lower-pressure measurements as the aircraft transitions through the reversal of vertical direction towards the top of the aircraft's up-stroke. Gravity will shorten the time period for reversal of vertical direction at the low-peak-pressure region of the aircraft's up-stroke. Avoidance of the use of outdated and unreliable breakout friction values previously stored within a look-up table will insure more accurate aircraft weight determinations. Real-time measurements of delta pressures eliminate potential and probable errors created by using previously recorded values; and currently assuming them as accurate breakout friction values to correct subsequent friction errors; when such assumed values cannot account for any changes in frictional forces of landing gear components, caused by environmental effects such as temperature and humidity; nor changes in landing gear strut seal breakout friction patterns caused by atypical wearing of strut seal mechanisms and/or imperfections and pitting of the surfaces of telescopically sliding components of the typical aircraft landing gear strut. Unrecognized changes in breakout friction will increase the error in weight measurements, when outdated friction data is used to correct strut pressure measurements.

In a search of the prior art, there are numerous onboard aircraft weight and balance systems which measure aircraft weight, utilizing methods and apparatus for measuring landing gear strut pressure and the further correction of measured pressure as it relates to the amount for weight supported, from distortions in strut pressure cause by landing gear seal friction. An objective of the systems and methods described herein is to increase the accuracy of aircraft weight measuring system, which measure landing gear strut pressure.

Prior art uses of strut pressure to determine aircraft weight and balance can be divided into two basic strategies.

The first of these strategies use a method of pre-measuring the amount of strut seal breakout friction at the initial installation of the system/apparatus hardware onto the aircraft and record the pre-measured friction values at each respective landing gear strut into a computer memory look-up table, for later use in the determination of aircraft weight. Variations of this approach are well documented and reference may be made to:

U.S. Pat. No. 5,214,586—Nance, which teaches a method of an aircraft weight and balance system calibration process, with apparatus which utilizes a computer, including a look-up table memory for the storing and subsequent retrieval of previously measured landing gear strut breakout friction values; and U.S. Pat. No. 7,967,244—Long, which teaches a method of an aircraft weight and balance system calibration process, with apparatus which utilizes a computer, including a look-up table memory for the storing and subsequent retrieval of previously measured landing gear strut breakout friction values, which have been recorded beforehand, during the system's calibration process. Additionally, through a method of simulating added weight or load onto the aircraft, applied weight increases are measured, prior to any increase in strut pressure, and are subsequently related to an archived value for strut breakout friction.

A second strategy for the measurement of strut breakout friction is the method to "induce the exercising" of the aircraft's telescopic landing gear struts while the aircraft rests stationary, with the aircraft weight remaining constant. Forcing the strut to move telescopically allows for a real-time determination of strut "high and low peak pressure values" to correct for pressure distortions, as related to weight supported. Variations of this approach are well documented and reference may be made to United States Patents:

| | |
|---|---|
| # 5,548,517 - Nance | # 5,521,827 - Lindberg |
| # 6,126,951 - Nance | # 6,237,406 - Nance |
| # 6,237,407 - Nance | |

The additional weight penalties and complexities for these types of added apparatus and their interactions with safety concerns, by the system penetrating into the existing aircraft's hydraulic control systems, have made them undesirable to the airline industry.

Additional prior art related to aircraft landing gear friction is described in U.S. Pat. No. 6,032,090—von Bose; which teaches the additional art of exercising the landing gear strut with an auxiliary pump mechanism installed onto the aircraft to further measure both landing gear strut static and dynamic sliding friction, which also uses the measurement of vertical acceleration while the aircraft remains stationary at the gate, in measuring the transition from static to dynamic sliding seal friction. The prior art of von Bose measures strut friction of a stationary aircraft, at the gate, in real-time, with a mechanical pump and reservoir device to force strut movement and does not use any type of computer look-up table or memory to store and subsequently re-use strut seal friction values.

United States Patent Application Publication # US/2006/0220918-A1—Stockwell, teaches rotating landing gear strut O-ring seals within the housing of the strut cylinder, as a means to reduce landing gear strut seal friction, which is used to reduce frictional errors, in the measurement of aircraft weight.

U.S. Pat. No. 4,007,894—Hartel, teaches a method and apparatus for minimizing axial friction forces in a cylinder-piston shock absorber and further teaches rotating the bearing structure with respect to the cylinder and piston. Such rotation minimizes axial friction forces in the assembly, allowing the fluid pressure to assume a value accurately reflecting the axial load.

U.S. Pat. No. 4,979,595—Paton, teaches a fluid actuated friction damper with apparatus including a cylinder with an expandable piston assembly, made up of a piston having two spaced apart parallel end walls which form an annular chamber. A curved friction member is located between these edges in this opening and is pressed against the inside of the cylinder by an underlying flexible actuator ring.

U.S. Pat. No. 3,581,836—Segerdahl, teaches a method for reducing frictional errors in determining the weight of an object supported by a pneumatic or hydraulic device. The device supporting the object has an internal pressure successively increased and decreased to determine the change in pressure experienced between the steady-state pressure required to raise the object and that pressure required to merely support the object. The lower state pressure plus ½ the difference between the higher and lower steady state pressure is then representative of the actual weight supported by the device.

SUMMARY OF THE INVENTION

The methods and apparatus described herein provide a means for increasing the accuracy of aircraft OnBoard Weight and Balance Systems, using landing gear strut pressures.

The methods and systems described herein provide for increasing the accuracy of aircraft weight and center of gravity determination through the use of "filtered" strut pressure measurements.

There is provided in one aspect of the invention, software algorithms which provide new methods, along with new apparatus; to frequently measure strut pressures, associated with 3-axis accelerations, and the groundspeed of the moving aircraft.

In accordance with another aspect, time-stamped strut pressure measurements are identified, which correlate to an oscillation pattern of wave propagation of the measured strut pressures, produced as the aircraft is taxiing horizontally and the aircraft hull oscillates vertically, and further identify strut pressure oscillations, generating ranges of high-peak pressures and low-peak pressures recorded along respective strut pressure waves.

In accordance with another aspect, the method comprises the step of, using software algorithms, linking time-stamped 3-axis acceleration measurements by tagging the amount and direction of aircraft acceleration to the corresponding time-stamped strut pressure measurements.

In accordance with another aspect, such tagging of landing gear pressure measurements with corresponding aircraft acceleration measurements, comprises a means of identifying, filtering and discarding those tagged strut pressure measurements which are degraded by excessive aircraft acceleration values, which are greater than zero or near-zero acceleration, of which positive and negative accelerations distort strut pressures, as they would correspond with the true-weight supported by each landing gear.

In accordance with still another aspect, landing gear strut pressures associated with acceleration values notably greater than zero are discarded, resulting in only those pressure measurements at zero or near-zero acceleration, not being discarded; resulting in only pressure measurements net of excessive acceleration remaining and averaged to further computed and measure the weight supported by each respective landing gear.

In accordance with another aspect, software algorithms average the high-peak pressures and low-peak pressures, along an oscillation wave, populated by the measured strut pressures, to determine a $1^{st}$ median-pressure.

In accordance with still another aspect, and as opposed to only averaging the extreme high-peak and low-peak pressures, software algorithms average all high pressures recorded above the $1^{st}$ median-pressure, and all low pressures recorded below the $1^{st}$ median-pressure, to determine a 1st mean-pressure.

In accordance with still another aspect, the identified difference between the $1^{st}$ median-pressure to that of the 1st mean-pressure, initially determines the Earth's gravity bias towards the high-pressure measurements, thus calculating the aircraft's weight heavier than the true-weight.

In accordance with still another aspect, software algorithms determine the number of pressure measurements within each oscillation wave for pressure values greater than the determined $1^{st}$ median-pressure, and determine the number of pressure measurement within the oscillation wave for pressure values less than the determined $1^{st}$ median-pressure; which further identifies the downward force of Earth's gravity accumulating a larger number of pressure measurements greater than the $1^{st}$ median-pressure, as opposed to a smaller number of pressure measurements less than the $1^{st}$ median-pressure; and by re-averaging all pressure measurements, to further determine a 1st mean-pressure.

In accordance with still another aspect, software algorithms delete and remove strut pressure measurements identified and tagged with excessive vertical acceleration above and below the 1st mean-pressure, to further average the filtered pressure measurements to determine a 2nd median-pressure.

In accordance with still another aspect, software algorithms identify an asymmetry of the accumulated oscillation wave pressure measurements.

In accordance with still another aspect, while recognizing that aircraft landing gear O-ring seals are designed to deflect differently (deflect more) when exposed to higher levels of internal pressure (changing the physical profile of the sealing surface, to provide an additional amount of sealing surface as internal pressures increase) software algorithms identify asymmetry between the higher pressures when compared to lower pressures, recorded along the pressure oscillation wave. Such asymmetry related to higher frictional forces generated during the compression stroke of the landing gear, as opposed to the lower frictional forces determined during the extension stroke of the landing gear.

In accordance with still another aspect, software algorithms discard the determined unequal number of the recorded high-pressure measurements above the pressure median, to that of the recorded low-pressure measurements below the pressure median; to provide symmetry above and below the median pressure, of the pressure oscillation wave.

In accordance with another aspect, software algorithms average the now filtered and symmetrical number of total strut pressure values, to determine a strut pressure, which is net or near-net of landing gear strut seal friction distortions, to provide a more accurate strut pressure as it relates to the true-weight supported.

The apparatus and processes for increasing the accuracy of weight determination through the use of filtered strut pressure measurements, with the correlation and tagging of strut pressures with associated acceleration values and providing symmetry to high-pressure and low-pressure measurements; shall be fully described in the new methods and apparatus of this invention, and illustrated throughout the Figures and Descriptions herein.

BRIEF DESCRIPTION OF THE DRAWINGS

Although the features of this invention, which are considered to be novel, are expressed in the appended claims; further details as to preferred practices and as to the further objects and features thereof may be most readily comprehended through reference to the following description when taken in connection with the accompanying drawings, wherein:

FIG. 2 is a side view of a typical aircraft landing gear strut with various elements of the invention attached to the landing gear strut.

FIGS. 3a, 3b, 3c and 3d are side views of a typical aircraft landing gear strut, where various elements of the invention are attached to the landing gear strut and are identified on FIG. 3a; where FIGS. 3b, 3c and 3d further illustrate pressure differentials within the strut as it varies in telescopic extension and compression, as the aircraft moves horizontally along an airport taxiway or runway, at a constant weight.

FIG. 4 illustrates a comparison of oscillating waves created by measured landing gear strut high-peak pressures and low-peak pressures, to the corresponding wave relate to the vertical movement of the aircraft hull; where the strut pressure wave is a mirror image or "reversed reflection" of the oscillation wave of aircraft's measured vertical movement as the aircraft is taxiing, while sensors measure vertical acceleration.

FIGS. 4a, 4b and 4c illustrate data-streams of strut pressure measurements. FIG. 4a illustrates the "assumptions" that strut pressure oscillations are systematical. FIG. 4b illustrates on-aircraft field-testing, illustrating strut pressure oscillation pattern asymmetry. FIG. 4c illustrates the filtering and removal of identified pressure outliers, to a more-narrow band of pressure measurements, tagged to a near-neutral vertical acceleration.

FIG. 6 is a schematic diagram of the onboard computer, with sensor inputs and software programs of this invention, which are used in determining landing gear strut pressure values associated with the aircraft hull acceleration, identified when the aircraft is in a state of near-neutral acceleration.

DETAILED DESCRIPTION OF THE PREFERRED EMBODIMENT

Figure 1:
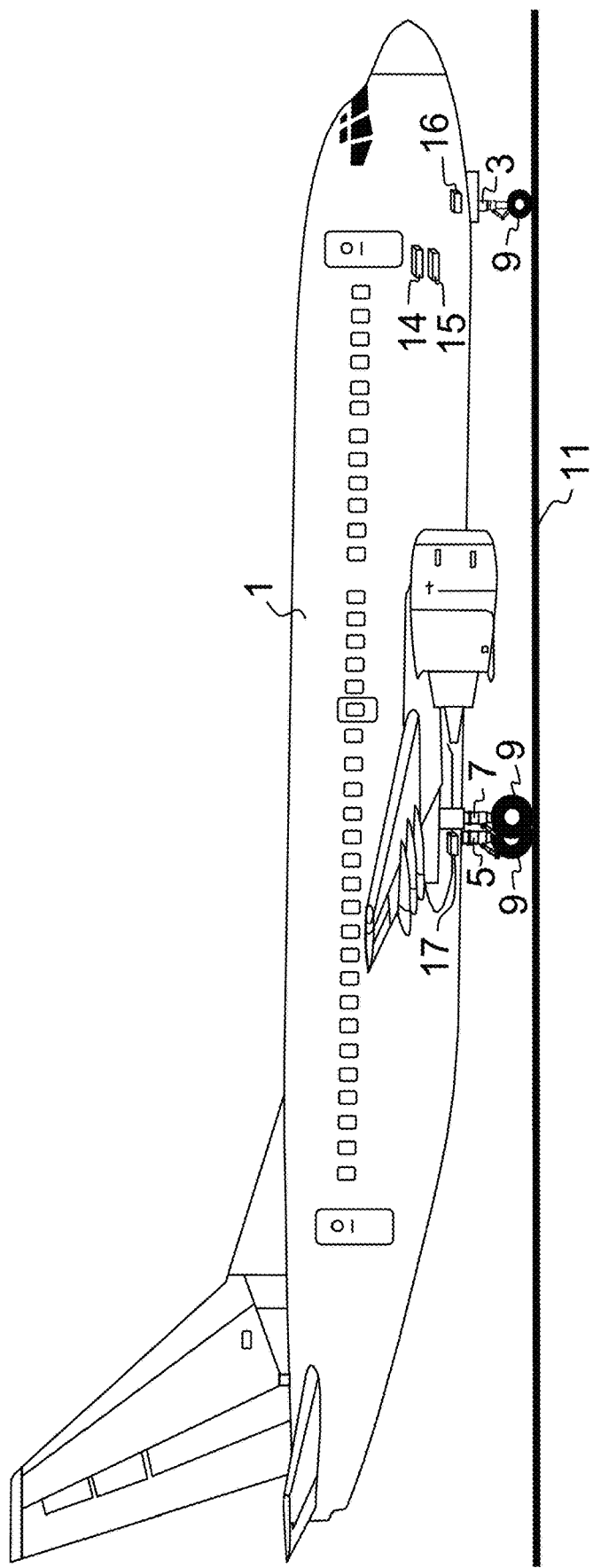
FIG. 1 is a side view of a typical air transport category aircraft, with a tricycle type landing gear in the extended position, resting on the ground, with various components of the invention.

An aircraft is typically supported by plural landing gear struts. In many if not most cases, aircraft are supported by three landing gear struts. Landing gear struts are designed much like, and incorporate many of the features of a typical telescopic shock absorber. The shock absorber of the landing gear strut comprises internal fluids, of both hydraulic oil and compressed gas. More simply said . . . "the weight of an aircraft rests upon 3-pockets of compressed gas." The aircraft weight is transferred to and is identified by the measured pressures contained within the landing gear struts. With a typical hydraulic load cell, the supported weight is proportional to pressure measured as "psi" (pounds per square inch). But, when using an oleo type telescopic landing gear strut as a hydraulic load cell, O-ring seals within the landing gear produce friction, which retain the high pressures within the strut and will distort measured internal strut pressure as it relates to the amount of true weight supported. The aircraft landing gear strut can better be used as an aircraft weighing scale, if measured strut pressures are filtered, to eliminate those pressure measurements, which are significantly distorted by landing gear strut seal friction.

While the aircraft is moving on the ground, typically traveling along a taxiway, the aircraft hull will oscillate vertically. During the taxi period, the telescopic landing gear struts are exercised by the weight of the aircraft bouncing atop the internal "gas-spring" within the landing gear; creating a corresponding oscillation wave of strut pressure measurements, identified by a range of high-peak pressures and an opposing range of low-peak pressures, produced by the unchanging weight of the aircraft transitioning upward then downward against the strut's internal gas pressure spring. Vertical movement of the aircraft is measured by a 3-axis accelerometer, as well as horizontal acceleration changes typically caused by pilot's applying engine thrust and/or applying the aircraft brakes. Horizontal acceleration from side to side is measured as "aircraft roll" when the aircraft is rocking back and forth between the two opposing main landing gear struts. Landing gear strut pressures will oscillate above and below a determined median pressure during this taxi-period, caused by the aircraft's changing vertical accelerations between the positive and negative vertical accelerations of the aircraft hull. As landing gear pressures are recorded, 3-axis accelerations of the aircraft hull are also measured and recorded. Respective pressure measurements are tagged and time-stamped with corresponding 3-axis acceleration measurements.

Earth's gravity will also affect the vertical movement of the aircraft as it travels horizontally along a taxiway. As an Example, to better illustrate the effects of Earth's gravity, one might consider pushing a two-wheel dolly loaded with weight along a horizontal pathway, which requires a specific amount of force. Pushing the dolly at the same weight up an inclined pathway requires a greater force, while pushing the same weight down an incline requires a lesser force. As the aircraft is taxiing, Earth's gravity will tend to hold the aircraft down for a slightly longer period of time, thus pressure measurements recorded during a constant sampling rate, will collect a slightly greater number of measurements during the aircraft's vertical down-stroke, when compared to the number of measure measurements as the aircraft transitions through the reversal of vertical direction towards the top of the aircraft's up-stroke. Gravity will shorten the time period for reversal of vertical direction at the low-peak-pressure region of the aircraft's up-stroke. The oscillation patterns of high-peak pressure and low-peak pressure within the landing gear strut create a wave, as pressure values are recorded and tagged to corresponding 3-axis acceleration measurements. Hundreds of pressure measurements are recorded throughout the pressure oscillation cycles, allowing for the identification of the range of "high-to-low-to-high-to-low" peak-pressure differentials, herein referred to as the "delta-pressure" as the aircraft is taxiing at a constant weight. Avoidance of the use of outdated and unreliable breakout friction values stored within a look-up table will insure more accurate aircraft weight determinations. Real-time measurements of delta-pressures eliminate potential and probable errors created by using previously recorded values; and currently assuming those as accurate breakout friction values to correct subsequent friction errors; when such assumed values cannot account for any changes in frictional forces of landing gear components, caused by environmental effects such as temperature and humidity; nor changes in landing gear strut seal breakout friction patterns caused by atypical wearing of strut seal mechanisms and/or imperfections, pitting and scarring to the surfaces of the telescopically sliding strut piston, cause by the NLG tires lifting up debris along a runway, with that debris striking the front of both MLG pistons during the take-off and/or landing runs. Unrecognized changes in friction forces will increase the error in weight measurements, when outdated friction data is used to correct current strut pressure measurements.

As the aircraft is taxiing, there are moments during the taxi-period where the aircraft vertical acceleration resides within a "near-neutral acceleration band". This near-neutral acceleration band, between positive acceleration (+g) and negative acceleration (−g) will correspond to a significantly more-narrow band of high-peak and low-peak strut delta-pressures. While the aircraft is floating atop the 3-pockets of compressed gas, landing gear strut pressures tagged at 0 g or near 0 g; are within a near-neutral acceleration band. Those near-neutral acceleration and opposing strut pressure values when averaged, are nearest to a net frictionless strut pressure value.

The recording of this pressure oscillation pattern in relation to aircraft vertical and horizontal acceleration creates both an aircraft vertical and horizontal "acceleration taxi-graph" (vertical acceleration taxi-graphs shown in FIGS. 4a, 4b and 4c). From the acceleration taxi-graphs, pressure measurements tagged with excessive positive or excessive negative accelerations are identified, then discarded; reducing to only those pressure measurements tagged with near-net 0 g acceleration, to provide a more-narrow band of high-peak and low-peak pressure values (shown in FIG. 4c), which are averaged into a more filtered median (and further determined, mean) strut pressure.

Identifying the near-net-of-friction pressure values and averaging them within this tighter band, reduces the need to further identify or make corrections to any pressure values for the higher "breakout friction" errors. The present invention identifies, filters and removes those greater and lesser peak pressure values, which are distorted by the breakout friction; to offer a new approach over that of the prior art aircraft weight and balance measuring systems, and now filtering to a more-narrow band of the pressure oscillation wave, thus offering better accuracy in determining the aircraft weight in real-time.

Referring now to the drawings, wherein like reference numerals designate corresponding parts throughout the several views and more particularly to FIG. 1 thereof, there is shown a typical Boeing 737 air transport category aircraft 1, with tricycle landing gear configuration consisting of a Nose Landing Gear ("NLG") 3, and two identical Main Landing Gears ("MLGs"), including a left-MLG 5 and a right-MLG 7 (both MLGs positioned at the same location longitudinally along the aircraft, but shown in perspective view for this illustration). Landing gear 3, 5 and 7 support and distribute the weight of aircraft 1 through tires 9 which are resting on the ground 11. Electronic components, which together are used in this invention and attached to aircraft 1 are a data acquisition computer 14, an inclinometer 15, a 3-axis accelerometer 16 positioned above and near NLG 3 and a 3-axis accelerometer 17 positioned above and near MLGs 5 and 7, which either or both accelerometers measure aircraft 1 groundspeed. In efforts to reduce the number of system components, NLG accelerometer 16 can be removed from the system hardware, if accelerometer 17 is positioned slightly forward of the MLGs, along the centerline of aircraft 1; to a position being 90% of the distance between the NLG and MLG, with that 90% positioning being AFT of the NLG; considering that 90% of weight of aircraft 1 is supported by the combined MLGs, and only 10% of the weight of aircraft 1 is supported by the NLG. A slight degradation is system accuracy may occur with the elimination of NLG accelerometer 16, but may be considered negligible in efforts to offset and reduce system hardware complexity.

Referring now to FIG. 2, there is shown a side view of an aircraft 1 telescopic oleo MLG strut 5 with tire 9, which distributes supported aircraft weight onto the ground 11; further illustrating landing gear strut cylinder 19, in which strut piston 21 moves telescopically. Pressure within telescopic strut 5 is measured and continually monitored by upper pressure sensor 23 and lower pressure sensor 25. MLG strut 5 has an internal orifice mechanism (not shown) that restricts high-rate fluid-flow within the telescopic strut 5. Such fluid-flow restrictions are used to absorb aircraft landing loads and can cause pressure measurements recorded at upper pressure sensor 23 to be different from the simultaneous measurements recorded at lower pressure sensor 25, while strut 5 is rapidly compressing during a landing event. As an alternative, and to eliminate a redundant component, pressure sensor 25 may be excluded, without significant degradation in pressure measurements taken during the taxi-period. A 3-axis accelerometer 17 is attached to aircraft hull 1, to monitor changes in vertical and horizontal movement of aircraft 1. The changes in vertical movements of aircraft hull 1 are measured and recorded as positive or negative g-forces (+g or −g). Pressure measurements recorded from pressure sensors 23 and 25, along with multi-axis acceleration measurements recorded from 3-axis accelerometer 17 are time-stamped and respectively tagged to identify their respective correlations, by data acquisition computer 14 (shown in FIG. 1) and software algorithms described in FIGS. 4a-4c and FIG. 6.

Referring now to FIG. 3a, there is shown a side view of a typical aircraft telescopic MLG strut 5, further identifying strut piston 21, which moves telescopically within cylinder 19. Strut cylinder 19 is attached directly to and moves congruently with aircraft hull 1. Aircraft hull 1 and landing gear strut cylinder 19, being attached, are both monitored by a multi-axis accelerometer 17, which measures vertical and horizontal movement, and other instruments which measure groundspeed. Pressure sensors 23 and 25 measure pressure within MLG 5.

Referring now to FIGS. 3b, 3c and 3d there are shown examples of a continuation from FIG. 3a where aircraft 1 has begun to move horizontally, as illustrated by the "Forward movement" box with a horizontal arrow. As aircraft 1 begins to taxi, over the ground 11; the aircraft weight supported by the pockets of compressible gas (which works as an internal spring contained within the telescopic strut 5), such spring will cause aircraft 1 to move vertically upward and downward, causing the internal strut pressure to oscillate with increases and decreases in strut pressure. Though the aircraft weight remains constant, the inertia of the aircraft weight traveling over a sometimes uneven taxi-way surface, will cause internal strut pressure to change, with a pattern of pressure oscillations between high-peak and low-peak pressure values. This upward and downward movement of aircraft 1 will transition to compression and extension of telescopic strut 5 and is further illustrated by increasing and decreasing internal strut pressure, as aircraft 1 moves horizontally along the surface of ground 11. Computer algorithms identify and tag respective pressure measurements to corresponding vertical and horizontal acceleration measurements from multi-axis accelerometer 17. When aircraft 1 is taxiing at a steady and constant speed, and the horizontal taxi-speed remains unchanged, strut pressure measurements taken during that steady speed of horizontal movement can provide a stabilized horizontal acceleration value of 0 g or near-net 0 g tagged to each pressure measurement.

As aircraft 1 moves upward and downward, with the compression and extension of piston 21 within cylinder 19; pressure sensors 23 and 25 measure the varying pressure within strut 5: 1,786 psi, → 1,740 psi, → 1,792 psi → 1,834 psi respectively, as accelerometer 17 measures the vertical movement of aircraft 1. During aircraft 1 taxi, the "delta pressure", being the difference in pressure between the high-peak pressure (1,834 psi) and the low-peak pressure (1,740 psi), within strut 5 is measured. The full delta-pressure range of 94 psi is determined (shown in FIG. 4b).

Referring now to FIG. 4 the primary objective of this FIG. 4 is to provide a better visualization for the comparison of the two taxi-graphs shown herein, and illustrate the mirrored, thus "reversed" pattern generated during the vertical movement of the aircraft hull as it bounces up and down, while rolling along a taxiway; to the oscillating pattern of the strut pressure measurements.

While the aircraft weight remains unchanged, changes in measured strut pressure are experienced as the aircraft is taxiing. Increases to the "vertical elevation" of the aircraft hull yields decreases in measured strut pressure. Decreases to the "vertical elevation" of the aircraft hull causes the telescopic struts to compress, yielding increases in measured strut pressure.

Referring again to FIG. 4 there is shown in the upper example, a taxi-graph illustrated as oscillating wave 26 of the plotted pressure measurements from the landing gear strut. High-peak pressures and low-peak pressures, are measured by pressure sensors 23 and 25 (shown in FIG. 2). Each pressure measurement is indicated along the propagation of pressure wave 26, by either Round (●) or Triangle (▲) shaped symbols (more fully described below and in FIG. 4b).

Shown in the lower example, is a taxi-graph illustrated as oscillating wave 24, corresponding to aircraft vertical movement; as it transitions from the upward stroke to the downward stroke, while the aircraft is moving horizontally. Wave 24 is a mirror or "reflected" image of wave 26. Comparisons of wave 26 to wave 24 offer a better visualization of the corresponding actions, while strut pressures are increasing upwards along wave 26, the aircraft is moving downward, and progressing through the lower region of wave 24.

Corresponding patterns illustrated in the two opposing and reflected wave comparisons, identify a more-rounded reversal through the high-pressure peak regions of wave 26, illustrated by the longer horizontal dotted-line 33; and directly corresponds with the aircraft's downward vertical movement, applying more load and pressures onto the strut, and illustrated in wave 24, having a corresponding more-rounded reversal in aircraft vertical movement and illustrated by the longer horizontal dotted-line 36.

During the aircraft up-stroke movement, shown along the upper region of aircraft acceleration wave 24 finds a more-narrow arc in the reversal of aircraft's vertical movement and is illustrated by a shorter dotted-line 32, which corresponds to the shorter dotted-line 35 in the lower region of strut pressure wave 26.

Double-arrow line 34 points to the comparison of the Earth's gravity induced sharper reversals in the low-pressure regions of wave 26 and the corresponding sharper reversals in aircraft vertical acceleration in the upper regions of wave 24, while the aircraft transitions through an up-stroke in vertical acceleration. Double-arrow line 38 points to the comparison of the Earth's gravity induced more-rounded reversals in the high-pressure regions of wave 26, and the corresponding more-rounded arc in aircraft vertical acceleration shown in wave 24, while the aircraft transitions through a down-stroke in vertical acceleration.

In the Example shown, pressure measurements are recorded at a rate of 10 measurements per second, resulting in eighty (80) pressure measurements recorded over an 8-second period of time. Other speeds of measurement sampling rates, for pressure and acceleration may be selected, depending upon the desired number of respective measurements, when considering the further filtering of "outlier pressure measurements" which shall be fully described within FIGS. 4a, 4b, and 4c.

Referring now to FIGS. 4a, 4b and 4c, there are shown examples of taxi-graphs of pressure oscillations, for strut pressure measurements recorded over an 8-second period of time. Though there is a large amount of information shown within these series of taxi-graphs, it is helpful to review them together, and through the transition and filtering of pressures measurements, to remove pressure outliers; allowing refinement into a tighter band of wave 30 (shown in FIG. 4c) of the non-rejected pressure measurements, which pass the acceleration filtering process, with those filtered pressure measurements subsequently averaged into single mean-pressure value proportional to the true-weight supported.

Individual strut pressure measurements, shown along the taxi-graph in FIG. 4a are indicated by Diamond shaped (♦) symbols populated along oscillating wave 26, and are tagged with corresponding changes in vertical acceleration, as the aircraft is taxiing.

In separate taxi-graphs (not shown) respective and corresponding strut pressure measurements are tagged with changes in "horizontal" acceleration, for both the longitudinal and lateral directions, of the aircraft as it is taxiing. Similar filtering is done to identify and remove pressure outliers, in further efforts to allow only those pressure measurements which are not distorted by excessive acceleration, be used in the final weight computations, The series of individual pressure measurements are indicated along the respective pressure wave, of oscillating lines 26, 28 and 30, with various symbol shapes:

FIG. 4a—Diamond-shaped (♦) symbols are used to indicate and tag all pressure measurements with acceleration values.

FIG. 4b—Round-Dot (●) symbols are used to re-indicate identified pressure measurements, which are then re-tagged with either excessive "positive or negative" vertical acceleration.

FIGS. 4b and 4c—Triangle-shaped (▲) symbols are used to re-indicate identified pressure measurements, which are then re-tagged with a near-neutral or near-net-zero vertical acceleration.

In the Examples shown: all pressure measurements are tagged and shown within vertical acceleration ranging from +0.08 g, 0.00 g, −0.08 g. Additional evaluations performed by re-running the same strut pressure data, through a more restrictive filtering range from +0.02 g, to −0.02 g; finds the more aggressive filtering range resulting with only 16 of the 800 data points recorded, passing all of the filtering screens. When running the strut pressure data at the filtering range from +0.08 g, to −0.08 g; the pressure data finds a more porous filtering, allowing over 500 of the 800 data points passing through the filtering screens; but when using the broadened filter ranges, the system struggled in maintaining the desired accuracy. Further re-runs of the pressure data have shown a vertical acceleration range of +0.04 g, to −0.04 g to be the preferred and acceptable vertical acceleration range. Other acceleration ranges may be determined as acceptable, depending upon the system accuracy and/or data volume requirements.

Referring again to FIG. 4a, previous assumptions have the pressure oscillations shown as oscillating wave 26 of the taxi-graph and would be expected to have a symmetrical pattern of pressures, rising to a relatively sharp reversal at the high-pressure peaks, then falling to a corresponding sharp reversal at the low-pressure peaks.

Referring again to FIG. 4b, recent observations recorded from actual B737-700 on-aircraft field testing reveal a different oscillation pattern, which is shown by pressure wave 28, where the assumed sharp reversals were not generated on the high-pressure side of the wave. The best way to characterize what the testing has shown is: "Earth's gravity will bias the pressure oscillation patterns, to the high-pressure side of the total pressure average" as the aircraft moves downward (with a gravity assist) applying more load and higher pressures, for a slightly longer period of time, onto each landing gear.

During the taxi-period, as the aircraft initially moves vertically downward, compressing the landing gear strut and increasing the internal strut pressure; the strut pressure increases to a level that the downward inertia of the aircraft weight can no longer allow further strut compression. The increased strut pressure will force the aircraft to reverse directions and move back upwards, with a corresponding decrease in strut pressure.

In the taxi-graph Example shown as FIG. 4b, an oscillation pressure wave 28, identifies the high-peak pressure upper-range limit, shown by the upper-horizontal dashed-line 27, measured at 1,834 psi. The low-peak pressure lower-range limit is shown by the lower-horizontal dashed-line 29, measured at 1,740 psi. Initially, high-pressure peak values and low-pressure peak values are averaged, to identify a $1^{st}$ median-pressure of 1,787 psi and shown by dashed-line 31, which progresses along the centerline of pressure wave 28. The "un-filtered" peak-pressure limits identified along wave 28 create a "delta-pressure" range of 94 psi.

Subsequently, all pressure measurements (not just the peak-pressure limits) recorded throughout the entire pressure wave 28 are averaged to refine and determine a 1st mean-pressure value, shown by horizontal line 40, to identify an upward shift from the $1^{st}$ median-pressure 31. The upward shift in average pressure shown by $1^{st}$ mean-pressure 40 is caused by the effects of Earth's gravity, pulling the aircraft downward, causing the compressing landing gear to generate a greater number of pressure measurements during a slightly longer period of time, resulting in that greater number of pressure measurements being above $1^{st}$ median-pressure 31, when compared to the number pressure measurements below $1^{st}$ median-pressure 31, measured over an identical period of time.

On-aircraft testing has identified the symmetry in pressure reversals from the high-pressures to the low-pressures are not the assumed sharp reversal patterns (shown in FIG. 4a); but instead, the force of Earth's gravity tends to hold the aircraft down for a longer period of time, and inhibits the aircraft from an immediate reversal upwards, thus generating a more-rounded pressure reversal or "arc" which is identified within the high-pressure ranges. With a rapid-rate (10 hz) of recording pressure measurements, it has been discovered (shown in FIG. 4b) that a greater number of the high-pressure measurements are captured, through the broader and more-rounded curve in the pressure oscillations, on the high-pressure side the $1^{st}$ median-pressure 31; compared to the number of low-pressure measurements recorded when the aircraft moves upward through the sharper reversals through the lower sections of the pressure oscillation curve 28. As the aircraft moves upward, and strut pressures reduce; gravity again tends to bias the pressure patterns by inducing a sharper pressure reversal arc through the low-pressure measurements below the $1^{st}$ median-pressure 31. This "asymmetry" on the high-pressure range of wave 28 accumulates a greater number of high-pressure measurements compared to the number of measurements within the low-pressure range, along wave 28. The greater number of high-pressure measurements broadens the reversal curve, illustrated by the longer dotted-line 33 within the arc of the high-pressure curve; and the lesser number of low-pressure measurements sharpens the reversal curve, illustrated by the shorter dotted-line 35 within the arc of the low-pressure curve.

Referring again to FIG. 4b there is shown Examples of strut pressures recorded along wave 28 at a rate of 10 hz (as used herein with respect to recorded strut pressures, the term "10 hz" refers to ten measurements per second). As pressure within the landing gear oscillates over an 8-second time period, eighty (80) pressure measurements are recorded and tagged with corresponding acceleration values. In the Example shown: fifty-nine (59) of the pressure measurements are re-tagged with Round-Dot symbols, as having either excessive positive or negative acceleration, thus not located within the near-neutral acceleration band of pressures (further described in FIG. 4c), The fifty-nine (59) Round-Dot re-tagged pressure measurements are classified as "pressures outliers" and are to be discarded; resulting in only twenty-on (21) of the Triangle symbol, re-tagged as acceptable pressure measurements remaining.

Referring now to FIG. 4c there is shown a tighter range of "non-discarded pressures" which form oscillating wave 30, made up of the twenty-one (21) Triangle symbol pressure measurements re-tagged as "near-neutral" positive and negative vertical acceleration. These near-neutral acceleration re-tagged pressure measurements reside within this more-narrow range of pressures between the reduced high-pressure range limit shown by the upper-horizontal dashed-line 37, having a measured pressure of 1,822 psi. The low-peak pressure range limit is shown by the lower-horizontal dashed-line 39, having a measured pressure of 1,804 psi. High-pressure peak values and low-pressure peak values are averaged to identify a $2^{nd}$ median-pressure of 1,813 psi and shown by dashed-line 41, shown passing along the centerline of pressure wave 30. The re-tagged as "filtered" pressures identified along wave 30 create a significantly reduces oscillation pressure range of 18 psi. The reduced number of pressures, by those re-tagged as near-neutral or near-zero-acceleration, are all further averaged to identify an even more "filtered" but slightly elevated $2^{nd}$ mean-pressure 42. Though $2^{nd}$ mean-pressure 42 might be only a few psi greater than $2^{nd}$ median-pressure 41; applying these few psi to a much larger aircraft such as the Boeing 777 can reduce the errors in weight computations by thousands of pounds. Reducing the number of pressure outliers, resulting from frictional distortions and associated excessive accelerations; reduces the influences which degrade the weight measurement process, thus increases the accuracy of the final weight computations.

The re-tagged as "filtered" pressure measurements results in a more-narrow delta-pressure range of 18 psi; as opposed to the "un-filtered" pressure oscillation delta-pressure range of 94 psi (shown in FIG. 4b). Reducing the range between high-peak pressure to low-peak pressure, reduces the friction error, and reducing the friction error increases the accuracy of the weight measurement. As the aircraft continues to taxi throughout the remaining 52-seconds of a 1-minute data capture (continued 52-seconds Example: not shown), another one hundred fifty-seven (157) "non-discarded" near-neutral, and near-zero-acceleration pressure measurements are collected. Additional 1-minute periods of taxi-time generate similar one-hundred-fifty plus (150+) filtered pressure measurements, allowing numerous cycles of pressures to be recorded, averaged, and further re-averaged into a more precise pressure value, near-net of landing gear strut seal friction distortions; with those fully refined pressure measurements averaged into a single pressure value, used in the algorithm to determine a more precise pressure value associated with the current true-weight supported, then the pressure value is multiplied times the load supporting surface area within the landing gear strut cylinder; to further determine a sprung-weight value supported by a respective landing gear strut.

Beyond the effects of changes in acceleration, as strut pressures increase; broader reversal curves shown by dotted-line 33 are seen in the higher-pressure ranges, when compared to the sharper reversal curves shown by dotted-line 35 in the lower-pressure ranges. These differences are also influenced by the increases and decreases in frictional forces caused by the deflection of the pliable composite materials used in the manufacturing process of landing gear O-ring seals. The frictional force value (herein referred to as the: "friction-fingerprint") provides a direct correlation of strut pressure to the true-weight supported.

A stationary aircraft will experience changes in strut pressure while loading, as passengers enter the aircraft through the FWD door, and move AFT within the aircraft. The MLG strut pressure will typically increase during the loading period. The increasing strut pressures will be artificially low, due to the friction-fingerprint of the seals, supporting a portion of the added weight. MLG pressures measured during this loading period, and while on the strut's downstroke, are slightly less than those pressures corresponding to the true-weight supported. On the other hand, pressures measured while on the strut's upstroke are slightly less than the pressures corresponding to the true-weight supported. The MLG determined friction-fingerprint correction quantity is represented by a value expressed in conventional pressure units such as pounds per square inch (psi), pascals (Pa), and the like. Certain types of pressure sensors transmit recorded pressure, measured as psi, and converted to a digital signal comprising millivolts; therefore, the terms psi and millivolts both refer to the amount of pressure being recorded. The friction-fingerprint correction quantity for the strut on a downstroke can be made from comparison of the range of unfiltered high-peak pressures described in FIG. 4B, to that of the corresponding pressure range for the mean pressure value determined from the filtered pressure measurements described in FIG. 4c. The high-peak pressure range representing no correction for friction, and the filtered mean pressure being an assessment closest to a frictionless value. The difference between those determined values identifies the friction-fingerprint, measured as psi.

NLG pressures measured during this loading period can be both increasing as passengers board, then decreasing as those passengers move AFT within the aircraft. While on the strut's downstroke, pressures are slightly less than those pressures corresponding to the true-weight supported. The NLG determined friction-fingerprint correction is also represented by a value measured in conventional pressure measurement units. The friction-fingerprint value for the NLG strut on a downstroke can be made from comparison of the range of unfiltered high-peak pressures described in FIG. 4B, to that of the corresponding pressure range for the mean pressure value determined from the filtered pressure measurements described in FIG. 4c. The friction-fingerprint value for the NLG strut on an upstroke can be made from comparison of the range of unfiltered low-peak pressures described in FIG. 4B, to that of the corresponding pressure range for the mean pressure value determined from the filtered pressure measurements described in FIG. 4c.

Determination of which directional stroke (up or down) the strut is experiencing while the aircraft is stationary is made by determining strut pressure increases while on the downstroke, or pressure decreases while on an upstroke. Proper determination as to which direction the strut is stroking, determines which directional friction-fingerprint value is to be applied. A NLG strut on a down-stroke will have an artificially low pressure, thus the friction-fingerprint value will be applied as additional psi to the pressure measurement. When the strut is on an up-stroke, the friction-fingerprint value as psi is deducted from the pressure measurement.

The variations in friction-fingerprint values, are affected by changes in seal adhesion to the surface of the sliding strut piston and related to the "range" of currently experienced pressure, and other environmental factors. As the internal strut pressure increases, the pliable seal material will yield and deflect into a posture increasing the seal's functioning surface contact area, against the strut piston; when working within the higher-pressure ranges. Such increase in the seal's functioning surface area will result in greater levels of friction. Recognition of the range of pressure, along with any reversals in pressure; are correlated with the amount and direction of the aircraft's vertical acceleration; and are recorded, stored, and used to identify a specific frictional pattern for a specific set of strut seals thus compiling a strut seal data-base of the frictional force fingerprints for an airline's entire fleet of respective sets of struts seals. The frictional force fingerprint for a specific landing gear is determined over a period of time, as the aircraft is taxiing, and the strut is exercised at various aircraft weights, thus various ranges of strut pressure, thereby a frictional force fingerprint related to a specific pressure range is developed. The fingerprints are refined and referenced against variations in environmental conditions, specifically variations in relative humidity and surrounding temperature, which can also affect friction. Current relative humidity and outside temperature measurements are available through other instrumentation on the aircraft or provided to the system via wireless data-link communications, from the airport being operated from. A data-base is developed correlating these pressure ranges and environmental factors, relating current frictional force values experienced as the aircraft is taxiing, and while the strut is proceeding through a period of either sliding friction, or during a period of pressure reversal, within a specific pressure range; compared to prior and subsequent measuring events having a similar pressure range and environmental conditions. Differences in the friction-fingerprint of a specific set of strut seals relates directly to the range of current strut pressure and determining whether the strut is progressing along dynamic/sliding friction or is transitioning through the very brief period of static/break-out friction. Determination between the sliding or break-out friction can be made by reviewing the immediately prior pressure measurements; whether the pressure pattern is progressing along a constant path indicating sliding friction, or the pressure pattern has reversed in direction indicating break-out friction. Considering the aircraft experiences many thousands of landing gear exercising cycles each day, frictional force fingerprints can be developed over a relatively short period of time. Once a frictional force fingerprint is identified, further measuring and monitoring for minor changes or diversions in the fingerprint patterns are searched for and recorded, which can result as the landing gear seals wear over time. When a specific landing gear reaches its overhaul cycle limits, and the overhauled (or exchanged) landing gear is installed onto a specific aircraft; the frictional force fingerprinting process will restart and begin profiling the new strut seals.

During the loading period, and as weight is added to the aircraft, combined MLGs support about 90% of any added weight, thus as the aircraft is loaded pressures within the MLGs will always be increasing. With confidence that the pressures will be increasing, allows confidence that the seals are supporting some portion of the added weight and pressures are artificially low. The MLG friction-fingerprint value, for the current pressure range, is added to correct for the friction distortion of pressure. As weight increases and pressures increase into a higher range, the friction-fingerprint value may slightly increase, if pressures increase to a level dictating the use of a slightly higher friction-fingerprint correction value.

An alternate method to identify the specific amount of pressure distortion caused by a friction-fingerprint is revealed by re-running each pressure oscillation wave and removing the acceleration and identified pressure asymmetry corrections described in FIGS. 4, 4a, 4b and 4c; which removal of those corrections allows for the comparison of the difference between the prior filtered results to that of the unfiltered results, which difference further helps to identify the initial frictional force value and friction-fingerprint for a specific strut. Considering the measurement sampling rates of ten samples per second (10 hz), and with a typical 7-minutes of aircraft taxi-time per departure at higher strut pressures, and a similar 7-minutes of taxi-time upon landing, at lower strut pressures; repeating this process over a 120-day period allows for 1,008,000 repetitions of the friction-fingerprint identification process for each landing gear strut. With the extremely large number of data-points supporting this process, the statistical leveraging of 1,008,000 identified frictional force values, when averaged into a single value, allow for a very refined value to be used for subsequent frictional correction offsets for a respective landing gear. The frictional force values are revised and updated, as the values are recognized to have changed, because landing gear seal wear will change the frictional force value over time. Each landing gear strut is typically overhauled on a 10-year cycle. The friction-fingerprint profiling process will restart upon the landing gear overhaul, when new seals are installed.

Now, referring back to discussions related to aircraft vertical acceleration combined with the yielding of O-ring seals, as the aircraft transition in vertical direction, it forces the O-ring seals to reverse in direction as well; from telescopic extension to telescopic compression. This reversal generates the highest amount of yielding of the O-ring seal material, thus the highest level of friction force distortions to landing gear pressure, as related to the true-weight supported.

Referring again to FIG. 4c there is shown that the non-discarded pressure measurements would be assumed to all align near the 1st mean-pressure 40 (shown in FIG. 4b) or 2nd median-pressure 41 (shown in this FIG. 4c); but depending upon the prior direction from the transition of the telescopic strut piston, from either extending or compressing; the frictional drag effects of the "lesser" dynamic/sliding seal friction as the piston continues in a first telescopic direction; to that of the increased frictional drag effects experienced when overcoming the "greater" static/break-out seal friction as the piston movement reverses to a second telescopic direction; will place any near-neutral or near-net-zero vertical acceleration tagged pressure variations further "above or below" the 2nd median-pressure 41. Averaging only those re-tagged as filtered pressure values from this more-narrow band of pressures, which are unaffected by the reversal in strut direction from compression to extension, shown by wave 30, reduces the total number of pressure values, by the amount of those discarded higher and lower pressure measurements associated with the full range of delta-pressure measurements, which are then averaged and shown by the slightly elevated 2nd mean-pressure 42; thus reducing the potential friction-error band, and increases the accuracy of the weight measurement.

As a point of reference, with the Boeing 737 aircraft used as the example herein, having for each MLG a load supporting surface area of 38.44 square inches, and for the NLG 11.02 square inches; the more accurate weight measurement generated with better pressure corrections for internal strut seal friction within the combined MLGs and NLG equating to 1,813 psi–1,787 psi=26 psi, equating to 999.44 lbs. for the left-MLG; and with that amount doubled to account for the right-MLG, and further increased by 10% to account for the NLG; totals a more accurate weight determination by 2,199 pounds. The 2,199 pounds of error equates to the weight of 11 passengers, along with their carry-on items, being miscounted.

Referring again to FIG. 4b there is shown an "alternate method" to filter pressure measurements and correct for the Earth's gravity bias, which typically affect aircraft while taxing at heavier weight ranges and resulting in disproportionally heavier weight determinations than the true-weight of the aircraft. The gravity bias causes for a greater number of high-pressure measurements to be applied to the overall average of all pressures. Subsequent to the $1^{st}$ median-pressure 31 being determined, a count is taken for the number of pressure measurements, which are identified as greater than the $1^{st}$ median-pressure 31; and a parallel count is taken for the number of pressure measurements identified to be less than the $1^{st}$ median-pressure 31. These separate counts are illustrated by the "numerals within circles" as Examples: ④ ⑤ ⑥ placed inside the arc of each of the pressure oscillation curves, identifying the number of recorded pressure measurements associated with each section of the pressure wave 28. The total number of pressure measurements recorded during the first segment of wave 28, and identified above the 1$^{st}$ median-pressure line 31, is determined as six ⑥. The total number of pressure measurements recorded during the second segment of wave 28, and identified below the 1$^{st}$ median-pressure 31, is determined as four ④. The asymmetry in the total number of pressure measurements across the entire pressure wave 28, when comparing the counts from above and below the 1$^{st}$ median-pressure 31; being forty-two (42) pressure measurements located within the high-pressure section, and thirty-three (33) pressure measurements located within the low-pressure section; resulting in bias of nine (9) pressure measurements located within the high-pressure section, above the 1$^{st}$ median-pressure 31.

Relying solely on this asymmetrical number of pressures above and below 1$^{st}$ median-pressure 31, and to further average those asymmetrical values into a single pressure value for a respective strut, will generate a significantly heavier and invalid measurement of the aircraft's true-weight. To return symmetry to the averaging process, nine (9) of the high-pressure measurements are deducted from the total number of high-pressure measurements, to balance the number and symmetry above and below 1$^{st}$ median line 31, resulting in the averaging of the thirty-three (33) pressure measurements located on either side of 1$^{st}$ median-pressure 31. To avoid arbitrary removal of any of the discarded nine (9) specific pressure measurements, the respective nine (9) pressure measurements to be discarded are chosen by selecting those pressure measurements recorded which are nearest to the equivalency of the average pressure of all the pressures recorded nearest to 1$^{st}$ median-pressure line 31; thus the selected pressures to be removed will not re-bias the overall average. Equalizing the number of high-pressure measurements to that of low-pressure measurements will re-balance the curve for wave 28 and remove the Earth's gravity bias. This alternate method to filter and remove the gravity bias does not require the use of data recorded by the multi-axis accelerometer 17 (shown in FIG. 3a) but is merely a novel process to re-establish symmetry throughout the averaging process. This second method can also be used as a cross-check function, for use of both first and second methods in parallel, to determine similar aircraft weight results, thus validating both methods.

Figure 5:
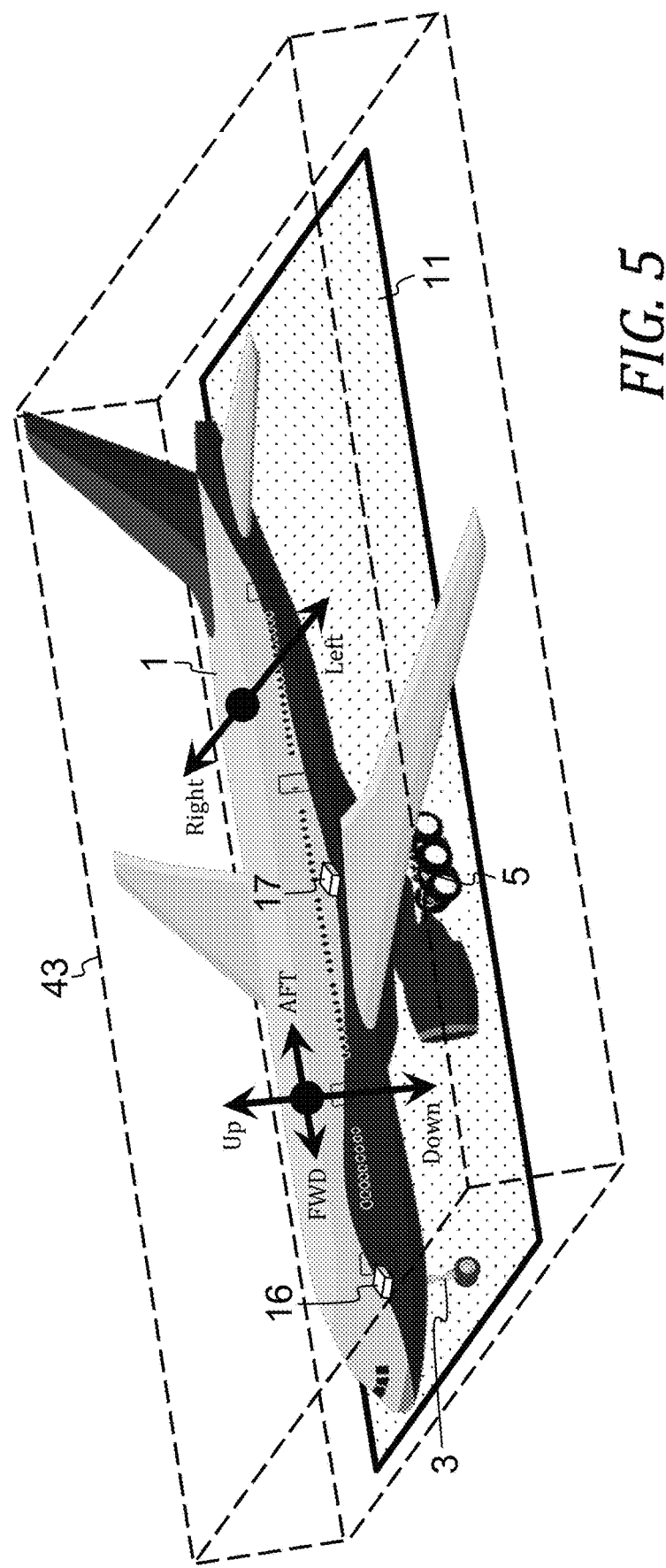
FIG. 5 is an illustration of the aircraft during taxi, with the taxiing aircraft shown as floating atop its landing gear, within a virtual cube of measured 3-axis acceleration.

Referring now to FIG. 5, there is shown aircraft 1 proceeding along a taxiway, built onto the ground 11; where aircraft 1 is suspended atop the 3-pockets of compressed gas within three respective landing gear, and floating within a 3-dimensional space shown as a "virtual" cube 43, of 3-axis acceleration. Multi-axis accelerometers 16 and 17 measure all movements of aircraft 1, and movements are recorded as "g-forces" both positive and negative. The processes described in FIGS. 4a, 4b and 4c of tagging the vertical accelerations, measured as g-forces, to recorded strut pressures are expanded to include horizontal accelerations both forward "FWD" and back "AFT", and horizontal accelerations from side to side "right and left." Blending of the 3-axis accelerations allows for measurement of aircraft pitch and roll, as the aircraft rocks back and forth, transferring the suspended load longitudinally between the NLG 3, and MLGs 5 and 7 (MLG 7 not shown); and laterally between the opposing left-MLG 5 and right-MLG 7 (shown in FIG. 1). Accelerometer 17 is located near the center of aircraft 1, near the MLG 5 position. An additional accelerometer 16 may also be used and positioned in the forward area of aircraft 1, near NLG 3.

Identifying aircraft 1 within a state of "net-zero" or near "net-zero" vertical and horizontal acceleration is the optimum time to capture strut pressure measurements, while the respective struts have the least amount of pressure distortions from positive or negative acceleration, and experiencing only the lesser pressure distortions of the "sliding" dynamic friction; as opposed to the greater pressure distortions experienced when overcoming "static" breakout friction during a reversal of strut pressure.

Referring now to FIG. 6, there is shown an Apparatus Block Diagram illustrating the various components which make up the apparatus of the invention, where multiple (NLG, left-MLG and right-MLG) upper pressure sensors 23 and lower pressure sensors 25, along with aircraft inclinometer 15, and with forward NLG accelerometer 16 and a mid-aircraft MLG accelerometer 17; which are all sources of data input into Computer 14.

Computer 14 is equipped with an internal clock and calendar to document the time and date of recorded and stored data. Computer 14 has multiple software packages, which include:

Software Program "Alpha"
which measure, record and timestamp pressures from respective NLG, left-MLG and right-MLG struts.

Software Program "Beta"
which measure, record and timestamp 3-axis acceleration at positions near NLG, and combined left-MLG and right-MLG struts, in directions including:
vertical
horizontal—FWD and AFT
horizontal—side to side Software Program "Gamma"
which is a continuation of Software Programs "Alpha" and "Beta" to further "tag" or designate the time-stamped all pressure measurements with a corresponding vertical and horizontal acceleration value, as strut pressures transition through the wave of pressure oscillations during the aircraft taxi-period.

Software Program "Delta"
which is a continuation of Software Program "Alpha" to further identify all recorded pressures along a pressure oscillation wave, and further determine the range of pressure between the highest high-peak pressure to that of the lowest low-peak pressure, herein referred to as the un-filtered delta-pressure.

Software Program "Epsilon"
which is a continuation of Software Program "Delta" to further recognize and determine a longer period of elapsed time taken to complete a high-pressure reversal (identified as a pressure reversal "arc") to that of the shorter period of elapsed time taken to complete a low-pressure reversal arc, along the oscillating pressure wave.

Software Program "Zeta"
which is a continuation of Software Program "Delta" to further determine an un-filtered 1$^{st}$ median-pressure 31 (described in FIG. 4b) by averaging the delta-pressure range, for each landing gear strut.

Software Program "Eta"
which is a continuation of Software Program "Epsilon" to further recognize and correct for Earth's gravity bias, effecting aircraft taxiing at heavier weights and the associated higher pressures within the respective landing gear struts; which gravity induces more rounded pressure reversals in the oscillation curves, through the higher-pressure ranges (described in FIG. 4b). Recognizing the asymmetrically greater number of higher pressures and averaging of all pressures throughout the oscillation wave 28, to identify a higher $1^{st}$ mean-pressure 40 (shown in FIG. 4*b*).

Software Program "Theta"

which is a continuation of Software Programs "Beta" and "Eta" to further discard respective pressures which are re-tagged with a vertical acceleration identified as excessive and outside of the determined acceptable acceleration values.

Software Program "Iota"

which is a continuation of Software Program "Theta" to further identify respective pressures which are re-tagged with non-stabilized vertical and horizontal accelerations, which are outside of the determined acceptable acceleration values; to determine those pressure measurements which are identified as acceptable and captured during the brief period while the aircraft maintains a state of near-neutral vertical and horizontal acceleration, and categorized as "filtered" pressures; to further determine a $2^{nd}$ median-pressure 41 (shown in FIG. 4*c*) being a value determined by averaging the highest and lowest "filtered" pressure limits values, now as the reduced delta-pressure range.

Software Program "Kappa"

which is a continuation of Software Program "Iota" to further average all re-tagged and filtered pressures, to identify a $2^{nd}$ mean-pressure 42 (shown in FIG. 4*c*).

Software Program "Lambda"

which is a continuation of Software Program "Zeta" to further recognize the aircraft taxiing at heavier weights and the associated higher pressures within the respective landing gear struts; recognizing a pressure range asymmetry, by having a greater number of above-median pressures compared to below-median pressures; to then discard the identified number of above-median pressure measurements in excess of the number of below-median pressure measurements, to achieve symmetry in the number of above-median pressure and below-median pressure measurements, then averaging of all remaining non-discarded pressures throughout the oscillation wave to allow an alternate method to increase accuracy.

Software Program "Mu"

which is a continuation of Software Programs "Eta" and "Kappa" which identifies the range of measured strut pressure, and direction of a most recent change in pressure, either increasing or decreasing; to correct for determined differences in the frictional force distortions to strut pressure, and changes to the frictional force values; related to the determined, periodically corrected and revised "friction-fingerprint" of respective landing gear seals, stored within seal friction-fingerprint data-base.

Software Program "Nu"

which monitors data from inclinometer 15 to measure changes in the angle of aircraft inclination (FWD-AFT), as an additional input to correct for aircraft angle being un-level with that of the ground 11 (Shown in FIG. 1).

The present invention has been described as installing additional aerospace components onto the aircraft and providing increased sources of data, to offer improvements to computer software and hardware features of prior art apparatus and methods. The present invention further provides a new process of identifying, tagging, re-tagging and discarding pressure measurements which distort the prior art process of simply averaging landing gear strut pressures into a single pressure value, related to the amount of weight supported by the pressure; for use to increase the accuracy in measuring aircraft weight, when utilizing landing gear strut pressure; with such embodiments attached to telescopic elements, of oleo type aircraft landing gear struts. The present invention further provides a new process of identifying landing gear strut pressure oscillation wave asymmetries, and methods to remove the bias of pressure asymmetries, to re-balance the pressure oscillation curve. The invention could also apply to other types of industrial telescopic oleo devices.

Additionally, as an exemplary embodiment of the invention has been disclosed and discussed, it will be understood that other applications of the invention are possible, and that the embodiment disclosed may be subject to various changes, modifications, and substitutions without necessarily departing from the spirit and scope of the invention.

The invention claimed is:

1. An aircraft operation method of providing weight information for dispatching of the aircraft for a flight, the aircraft having respective telescopic landing gear struts that support the weight of the aircraft, the landing gear struts having seals, the strut seals creating friction that interferes with the free telescoping movement of the landing gear, the method comprising the steps of:
   a. measuring a series of 3-axis accelerations of the aircraft;
   b. measuring a series of pressures within the respective landing gear struts;
   c. identifying respective measured aircraft accelerations that share a common measurement date and time with respective measured strut pressures to create tagged measured pressures;
   d. plotting the tagged measured pressures in a taxi-graph, the taxi-graph comprising an oscillation curve comprising the tagged measured pressures;
   e. using the taxi-graph, to further identify filtered measured pressures, the filtered measured pressures being identified as measured pressures re-tagged with acceleration values that are below a predetermined acceleration value;
   f. using the re-tagged filtered measured pressures to determine averaged pressure values, the averaged pressure values comprising respective near-neutral acceleration pressure values, respective median pressure values, and respective mean pressure values;
   g. using the respective averaged pressure values to increase accuracy in determining the weight supported at the respective landing gear struts.

2. The aircraft operation method of claim 1 wherein the aircraft comprises at least one pressure sensor on the respective landing gear strut, and wherein the step of measuring a series of pressures within the respective landing gear struts further comprises recording the respective landing gear strut pressures.

3. The aircraft operation method of claim 1 wherein the aircraft comprises at least one 3-axis accelerometer, and wherein the step of measuring a series of 3-axis accelerations of the aircraft, comprises measuring vertical accelerations.

4. The aircraft operation method of claim 1 wherein the aircraft comprises at least one 3-axis accelerometer, and wherein the step of measuring a series of 3-axis accelerations of the aircraft comprises measuring horizontal accelerations.

5. The aircraft operation method of claim 4 wherein the aircraft comprises at least one 3-axis accelerometer, and wherein the step of measuring horizontal accelerations further comprises the step of determining a constant aircraft groundspeed.

6. The aircraft operation method of claim 1 further comprising the steps of:
   a. determining a pressure range between respective high-peak tagged measured pressures and low-peak tagged measured pressures;
   b. determining a median pressure of the tagged measured pressures.

7. The aircraft operation method of claim 1 further comprising the steps of:
   a. determining a pressure range of the tagged measured pressures;
   b. determining a mean of the tagged measured pressures.

8. The aircraft operation method of claim 1, further comprising the steps of:
   a. determining a pressure range between respective high-peak re-tagged measured pressures and respective low-peak tagged measured pressures;
   b. determining a range of acceptable acceleration values;
   c. plotting the filtered measured pressures in a second taxi-graph, the second taxi-graph comprising a second oscillation curve, the second oscillation curve comprising the filtered re-tagged measured pressures.

9. The aircraft operation method of claim 8 further comprising the steps of:
   a. determining a pressure range between respective high-peak re-tagged measured pressures and low-peak re-tagged measured pressures;
   b. determining a second-median pressure of the re-tagged measured pressures.

10. The aircraft operation method of claim 8 further comprising the steps of:
    a. determining a pressure range of the filtered re-tagged measured pressures;
    b. determining a second-mean of the filtered re-tagged measured pressures.

11. An aircraft operation method of providing weight information for dispatching of the aircraft for a flight, the aircraft having respective telescopic landing gear struts that support the weight of the aircraft, the landing gear struts having seals, the strut seals creating friction that interferes with the free telescoping movement of the landing gear, the method comprising the steps of:
    a. measuring a series of pressures within the respective landing gear struts;
    b. plotting the measured pressures in a respective taxi-graph, the taxi-graph comprising an oscillation curve comprising the measured pressures;
    c. determining a pressure range between respective high-peak measured pressures and low-peak measured pressures;
    d. determining a median pressure of the measured pressures;
    e. determining a number of respective measured pressures identified as being equal to or above the respective median pressure;
    f. determining a number of respective measured pressures identified as being equal to or below the respective median pressure;
    g. determining a number of measured pressures generating asymmetry between the number of measured pressures above and the number of measured pressures below, the respective median pressure;
    h. discarding selected measured pressures above or below the respective median pressure, to eliminate asymmetry, to balance the number of respective recorded pressures and to arrive at a balanced number of respective measured pressures;
    i. averaging the respective balanced number of respective measured pressures:
    j. determining a mean of the balanced number of measured pressures;
    k. using the respective mean pressure value to increase accuracy in determining the weight supported at the respective landing gear struts.

12. The aircraft operation method of claim 7 further comprising the steps of:
    a. determining, respectively, a difference between the tagged pressure range and an unfiltered mean pressure range;
    b. identifying a respective breakout friction-fingerprint value of the respective struts, the respective breakout friction-fingerprint value of the respective struts being a respective measured breakout frictional force value of the respective struts;
    c. applying the respective identified measured breakout friction-fingerprint value to determine a corrected reversing strut pressure value of a stationary aircraft, to increase accuracy in determining the weight supported at the respective landing gear struts.

13. The aircraft operation method of claim 10 further comprising the steps of:
    a. determining, respectively, a difference between the tagged pressure range and a filtered second-mean pressure range;
    b. identifying a respective sliding friction-fingerprint value of the respective struts, the respective sliding friction-fingerprint value of the respective struts being a respective measured sliding frictional force value of the respective struts;
    c. applying the respective identified measured sliding friction-fingerprint value to determine a corrected sliding strut pressure value of the aircraft, while stationary, to increase accuracy in determining the weight supported at the respective landing gear struts.

14. A method of increasing accuracy of aircraft weight and associated center of gravity determinations, the aircraft having landing gear struts, each landing gear strut comprising a piston telescoping within a cylinder, the strut comprising fluids and a seal, the piston experiencing friction with the cylinder, the strut having at least one pressure sensor, the aircraft having at least one multi-axis accelerometer, the method comprising the steps of:
    a. operating the aircraft so as to telescopically move the piston within the cylinder over time;
    b. measuring a pressure over time of the fluid while the piston telescopically moves within the cylinder, the measured pressure having high-pressure values and low-pressure values;
    c. measuring aircraft acceleration over time while the piston telescopically moves within the cylinder, the measured acceleration having positive and negative vertical acceleration values and horizontal acceleration values;
    d. tagging strut pressure to vertical and horizontal accelerations;
    e. determining a range of acceptable acceleration values;
    f. discarding re-tagged strut pressure measurements correlated with accelerations determined to be outside of the range of acceptable acceleration values;

g. averaging non-discarded pressure measurements to determine respective near-neutral acceleration pressure values and respective mean pressure values;

h. using the respective mean pressure values to increase accuracy in determining the weight supported at the respective landing gear struts.

15. A method of increasing accuracy of aircraft weight and associated center of gravity determinations, the aircraft having landing gear struts, each landing gear strut comprising a piston telescoping within a cylinder, the strut comprising fluids and a seal, the piston experiencing friction with the cylinder, the strut having at least one pressure sensor, the method comprising the steps of:

a. operating the aircraft so that the aircraft remains stationary over time;

b. adjusting an aircraft load so as to telescopically move the respective piston within the respective cylinder over time;

c. determining a respective measured pressure value by measuring respective strut fluid pressures over time while the respective piston telescopically moves within the respective cylinder;

d. determining a direction of respective strut telescopic movement;

e. determining a respective corrected pressure value by applying friction-fingerprint correction values that account for frictional force distortions;

f. using the respective corrected pressure value to increase accuracy in determining the weight supported at the respective landing gear struts.

16. The aircraft operation method of claim 11 further comprising the steps of:

a. developing a database of recorded respective friction-fingerprint values;

b. utilizing the database of friction-fingerprint values to correct the respective measured pressure values to increase accuracy in determining the weight supported at the respective landing gear struts.

17. The aircraft operation method of claim 12 further comprising the steps of:

a. developing a database of recorded respective breakout frictional force values;

b. utilizing the database of respective breakout frictional forces to correct the respective measured pressure values to increase accuracy in determining the weight supported at the respective landing gear struts.

18. The aircraft operation method of claim 13 further comprising the steps of:

a. developing a database of recorded respective sliding frictional force values;

b. utilizing the database of respective sliding frictional forces to correct the respective measured pressure values to increase accuracy in determining the weight supported at the respective landing gear struts.

* * * * *